United States Patent [19]
Murouchi et al.

[11] Patent Number: 6,036,568
[45] Date of Patent: Mar. 14, 2000

[54] METHOD AND APPARATUS FOR ASSEMBLING LIQUID CRYSTAL DISPLAY

[75] Inventors: Katsunori Murouchi, Himeji; Satoru Narioka, Fukaya; Tetsuya Nishino, Himeji; Hirokazu Morimoto; Takaomi Tanaka, both of Hyogo-ken; Tadashi Honda, Kawasaki; Hiroshi Otaguro, Himeji; Hironori Takabayashi, Yokohama; Toshitaka Nonaka, Fukaya, all of Japan

[73] Assignee: Kabushiki Kaisha Toshiba, Kawasaki, Japan

[21] Appl. No.: 09/090,260

[22] Filed: Jun. 4, 1998

[30] Foreign Application Priority Data

| Jun. 4, 1997 | [JP] | Japan | 9-146501 |
|---|---|---|---|
| May 22, 1998 | [JP] | Japan | 10-141565 |

[51] Int. Cl.⁷ .................................................. G02F 1/1341
[52] U.S. Cl. ........................................... 445/25; 349/190
[58] Field of Search ........................ 445/24, 25; 349/187, 349/190

[56] References Cited

U.S. PATENT DOCUMENTS 4,130,408  12/1978  Crossland et al. ..................... 349/190

FOREIGN PATENT DOCUMENTS

| 63-163423 | 6/1988 | Japan | 349/190 |
|---|---|---|---|
| 9-22018 | 1/1997 | Japan | . |

*Primary Examiner*—Kenneth J. Ramsey
*Attorney, Agent, or Firm*—Oblon, Spivak, McClelland, Maier & Neustadt, P.C.

[57] ABSTRACT

On the surface of an array substrate 60, a sealing material 64 is provided so as to surround a display region, and a plurality of spacers 66 are provided in the display region. The array substrate 60 and a counter substrate 62 are vacuum held to stages 20 and 18, respectively, so that the array substrate 60 and the counter substrate 62 face each other. In one of the stages, a recessed portion 26 facing the effective region of the counter substrate 62 is formed. By evacuating the recessed portion, the effective region of the counter substrate 62 is deflected so as to go away from the effective region of the array substrate 60. In this state, the peripheral portions of the array substrate 60 and the counter substrate 62 are panel aligned with each other via the sealing material 64. Subsequently, the counter substrate 62 is positioned with respect to the array substrate 60 by means of an X-Y-θ stage. Thereafter, the deflection of the counter substrate 62 is removed to cause the counter substrate 62 and the array substrate 60 to contact each other via the spacers 66. Thus, it is possible to provide an assembling method and apparatus, which can assemble a flat display panel without making scars on a glass substrate.

17 Claims, 17 Drawing Sheets

METHOD AND APPARATUS FOR ASSEMBLING LIQUID CRYSTAL DISPLAY

BACKGROUND OF THE INVENTION

1. Field of the Invention

The present invention relates generally to an apparatus and method for assembling substrates. More specifically, the invention relates to an apparatus and method for assembling a flat panel display, such as a liquid crystal display.

2. Related Background Art

Liquid crystal displays have been widely used as displays for note-type and subnote-type personal computers since they are thin and light and have low electric power consumption. In recent years, with the improvement of performance of personal computers, it has been required to increase the display capacity and display area of the displays and to improve the picture quality thereof.

Liquid crystal displays are formed by filling a liquid crystal molecule into a space between two glass substrates, which are panel aligned with each other via spacers. A typical liquid crystal display is assembled by the following process.

First, a pair of glass substrates are vacuum held to a pair of upper and lower stages facing each other, respectively. In this case, on the surface of the glass substrate held on the lower stage, a plurality of electrodes are formed. In addition, a rectangular frame-shaped sealing material for defining a display region therein and spacers for holding a gap between the two glass substrates are arranged. On the glass substrate held on the upper stage, a counter electrode, a color filter and so forth are provided.

In this state, after the upper stage is moved downwards so that the two glass substrates face each other at a predetermined interval, the upper stage is moved in X and Y directions and rotated on Z axis to position the two glass substrates on the basis of positioning marks or the like.

Subsequently, the upper stage is moved downwards to a position at which the upper glass substrate contacts the sealing material and the spacers on the lower glass substrate. In this case, fine displacement between the glass substrates is caused by the contact resistance between the two glass substrates via the spacers and the sealing material, the rigidity and parallelism of the upper and lower stages in vertical movement, and the back crush of X, Y and θ drive mechanisms.

Therefore, the positioning between the two glass substrates is carried out by moving the upper stage in X, Y and θ directions again while the two glass substrates contact each other via the sealing material and the spacers. After this positioning, a pressure is applied so that the gap between the two glass substrates is a predetermined value, and a liquid crystal material is filled into a space between the glass substrates.

However, when the positioning between the two glass substrates is carried out by moving one of the two glass substrates while the two glass substrates contact each other via the spacers as described above, there is some possibility that the spacers strongly rub and scar the surface of an alignment layer and sink into the color filter layer or the like.

As described above, since it has been strongly desired to improve the picture quality of liquid crystal displays in recent years, fine scars caused during producing process are treated as bad picture quality to cause a decrease in production yield.

SUMMARY OF THE INVENTION

It is therefore an object of the present invention to eliminate the aforementioned problems and to provide an assembling apparatus and method, which can assemble a pair of substrates without making scars the substrates.

In order to accomplish the aforementioned and other objects, according to one aspect of the present invention, there is provided an apparatus for assembling a liquid crystal display by positioning first and second substrates, one of which has a sealing material surrounding a display region in which a plurality of spacers are provided, the apparatus comprising: an upper stage for holding the first substrate; and a lower stages for holding the second substrate, wherein at least one of the upper and lower stages has means for deflecting a display region of at least one of the first and second substrates so as to go away from a display region of the other substrate.

According to another aspect of the present invention, there is provided an apparatus for assembling a liquid crystal display by positioning first and second substrates, one of which has a sealing material surrounding a display region in which a plurality of spacers are provided, the apparatus comprising: an upper stage for holding the first substrate; and a lower stages, arranged below the upper stage, for holding the second substrate in a mounting state, the lower stage having a peripheral portion for mounting the second substrate thereon and an inside recessed portion surrounded by the peripheral portion, the recessed portion allowing the second substrate to be deflected downwards due to the weight of the second substrate itself in the mounting state of the second substrate.

According to another aspect of the present invention, there is provided a method for assembling a liquid crystal display, which comprises the steps of: arranging first and second substrates so as to face each other, one of the first and second substrates having a sealing material which surrounds a display region in which a plurality of spacers are provided; panel aligning peripheral portions of the first and second substrates with each other via the sealing material; and positioning the first and second substrates by moving at least one of the first and second substrates, which have been panel aligned with each other, while a display region of at least one of the first and second substrates is deflected so as to go away from a display region of the other substrate.

According to another aspect of the present invention, a method for assembling a liquid crystal display by positioning first and second substrates, one of which has a sealing material surrounding a display region in which a plurality of spacers are provided, the method comprising the steps of: holding the first substrate by means of an upper stage; and holding the second substrate in a mounting state by means of a lower stage arranged below the upper stage, the lower stage having a peripheral portion for mounting the second substrate thereon and an inside recessed portion surrounded by the peripheral portion, the recessed portion allowing the second substrate to be deflected downwards due to the weight of the second substrate itself in the mounting state of the second substrate.

According to a further aspect of the present invention, there is provided a method for assembling a liquid crystal display, which comprises the steps of: arranging an array substrate and a counter substrate so as to face each other, the array substrate having a sealing material which surrounds a display region in which a plurality of spacers is provided, and the array substrate having pixels; panel aligning a peripheral portion of the array substrate with a peripheral portion of the counter substrate via the sealing material; and positioning the array substrate and the counter substrates by moving at least one of the array substrate and the counter substrates, which have been panel aligned with each other, while a display region of at least one of the array substrate and the counter substrates is deflected so as to go away from a display region of the other substrate.

According to a still further aspect of the present invention, there is provided a method for assembling a liquid crystal display, which comprises the steps of: arranging first and second substrates so as to face each other, one of the first and second substrates having a sealing material which surrounds a display region in which a plurality of spacers are provided; panel aligning peripheral portions of the first and second substrates with each other via the sealing material; positioning the first and second substrates by moving at least one of the first and second substrates, which have been panel aligned with each other, while a display region of at least one of the first and second substrates is deflected so as to go away from a display region of the other substrate; and removing the deflection of the at least one of the first and second substrates after the positioning is completed, to cause the display regions of the first and second substrate to contact each other.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Figure 1:
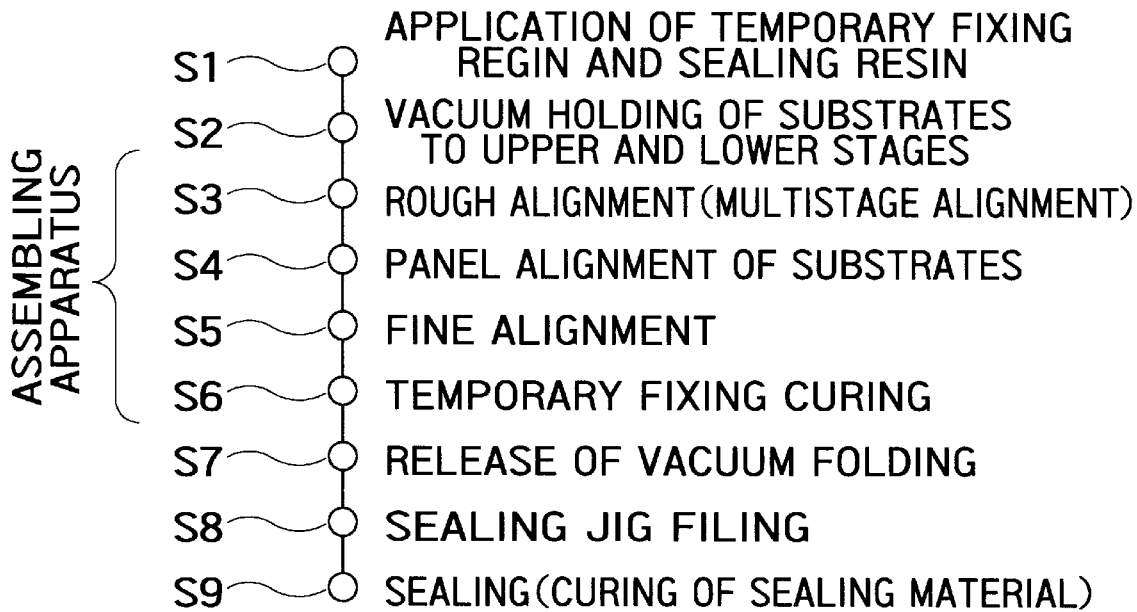
FIG. 1 is a flow chart showing a process for producing a liquid crystal display according to the present invention.

FIG. 1 shows a flow chart for assembling and pressing a lower array substrate and an upper counter substrate, and FIG. 23 shows a process for assembling the substrates. First, in accordance with the flow chart of FIG. 1, the assembling operation steps will be briefly described, and then, in connection with the respective operation steps, the first preferred embodiment of the present invention will be described in detail.

Figure 2:
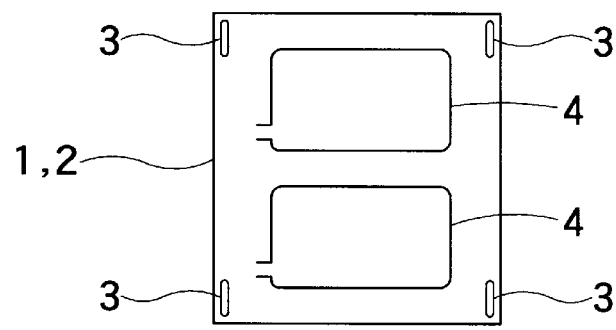
FIG. 2 is a plan view showing the resin applied positions, at which the temporary fixing and final sealing of a pair of substrates are carried out.

In the flow chart of FIG. 1, as can be seen from FIG. 2, a temporary fixing resin 3 and a sealing resin 4 are previously applied on an array substrate 1 in order to temporarily fix and seal a counter substrate 1 to the array substrate 1 as will be described later (S1). The temporary fixing resin 3 is a so-called UV curing agent, which is cured when being irradiated with ultraviolet light, and the sealing resin 4 is a so-called heat-curing-type sealing material for final sealing. Furthermore, FIG. 2 shows an example of a so-called two-chamfering.

Figure 3:
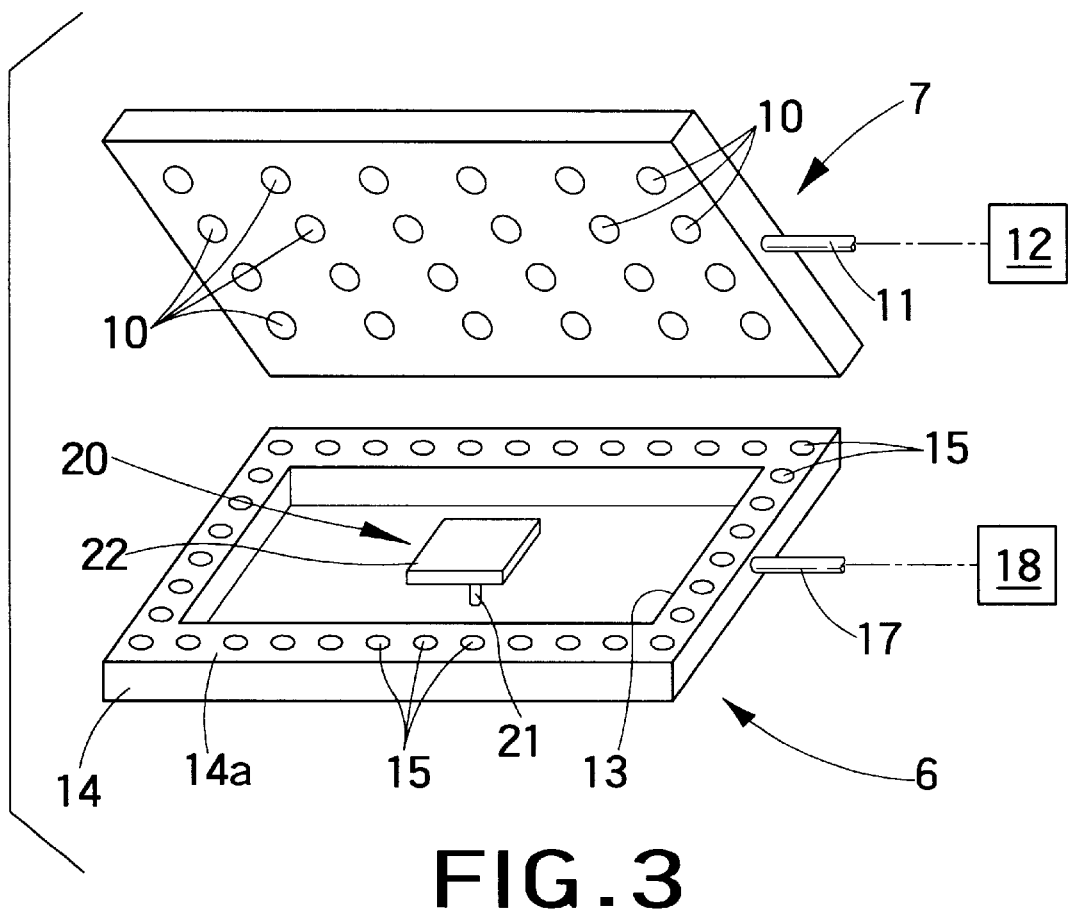
FIG. 3 is a perspective view of upper and lower stages.
Figure 5:
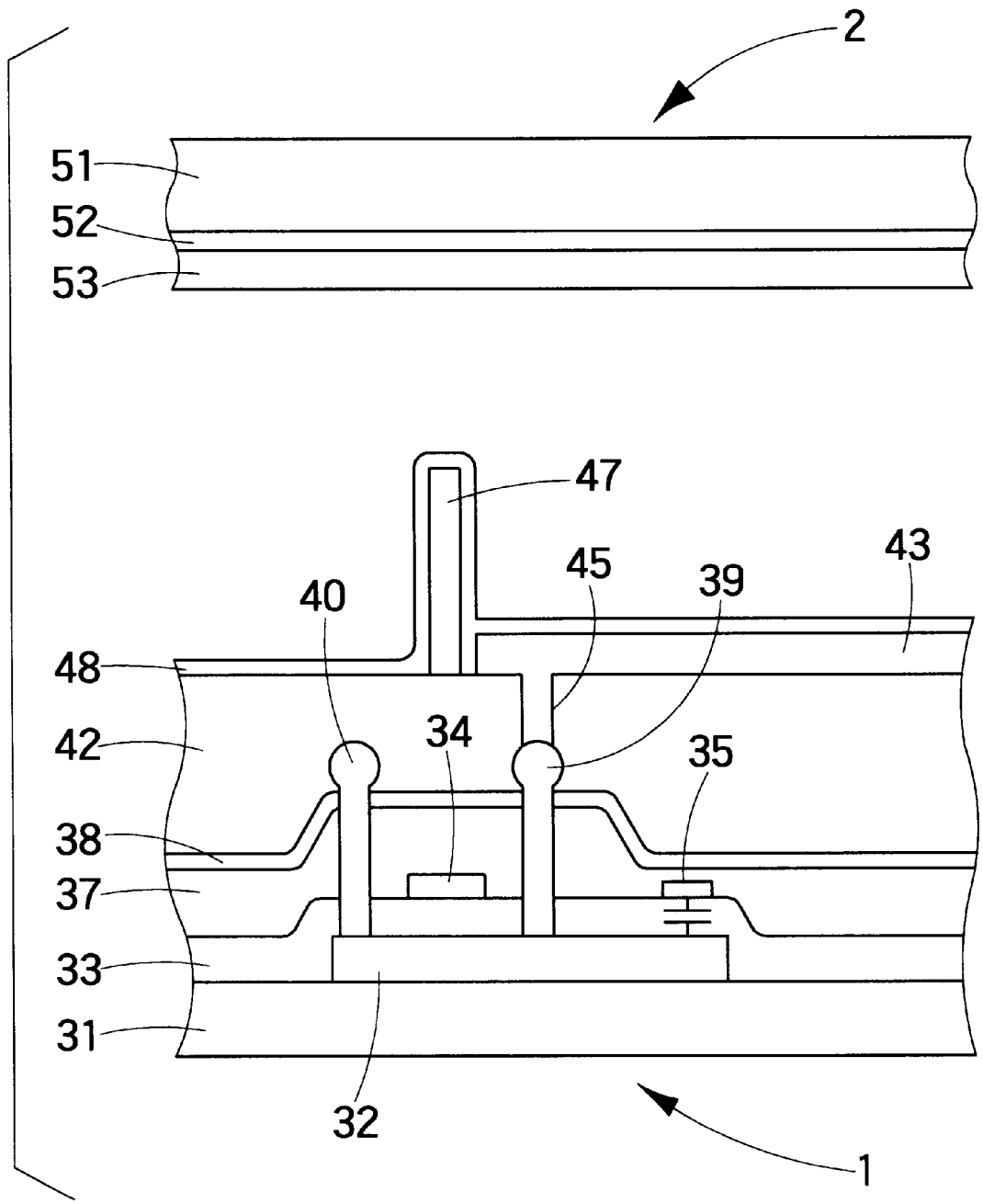
FIG. 5 is a cross-sectional view of a counter substrate and an array substrate, which are separated from each other.
Figure 6:
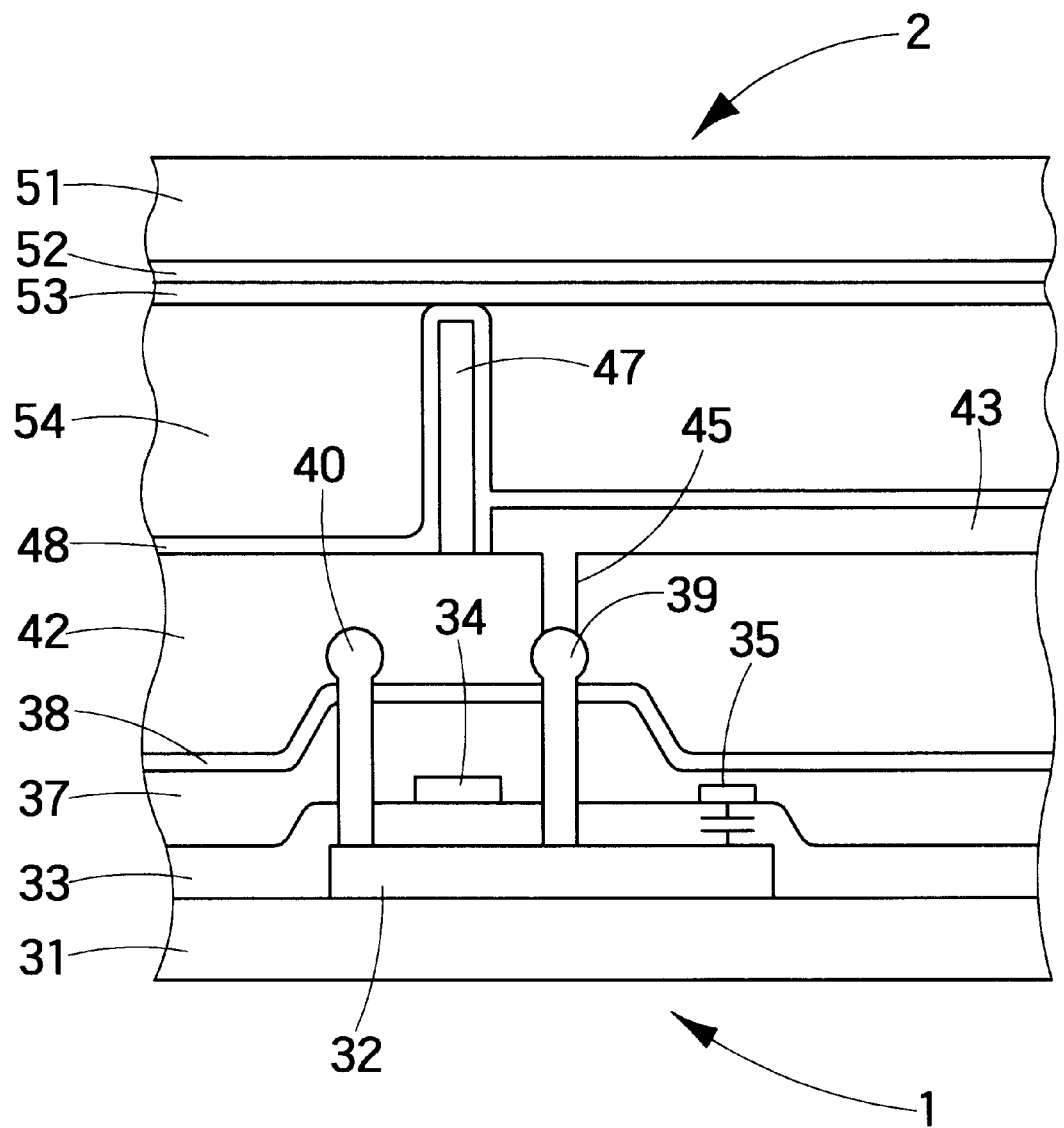
FIG. 6 is a cross-sectional view of the counter substrate and the array substrate, which are assembled.
Figure 7:
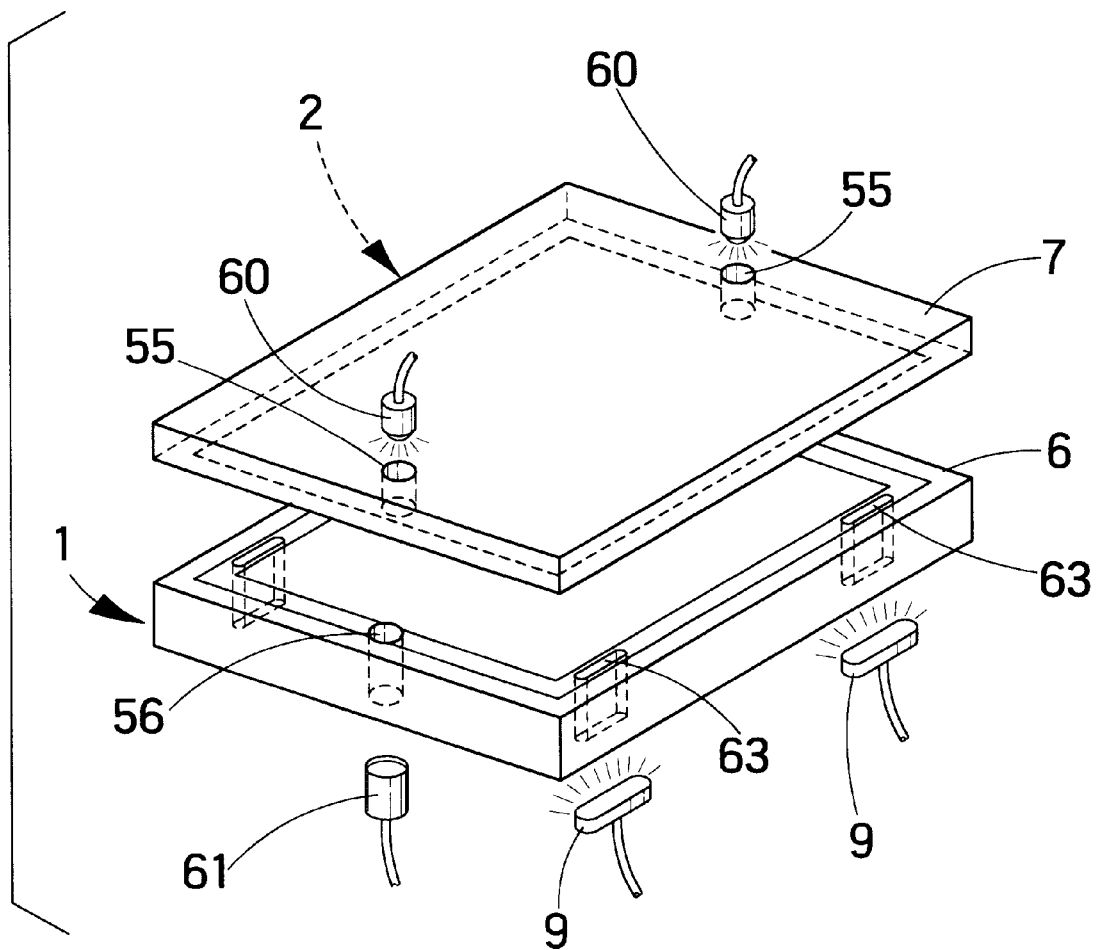
FIG. 7 is a perspective view of an assembling apparatus.

Thus, after the temporary fixing resin 3 and the sealing resin 4 are applied on the array substrate 1, a temporary fixing step is carried out by means of an assembling apparatus. That is, the array substrate 1 and the counter substrate 2, which are shown in FIGS. 5 and 6, are put on and vacuum held to a lower stage 6 and an upper stage 7, which are shown in FIG. 3, respectively. Then, as shown in FIG. 7, the array substrate 1 and the counter substrate 2 are caused to face each other, and the alignment, temporarily fixing and sealing thereof are carried out.

Figure 23A:
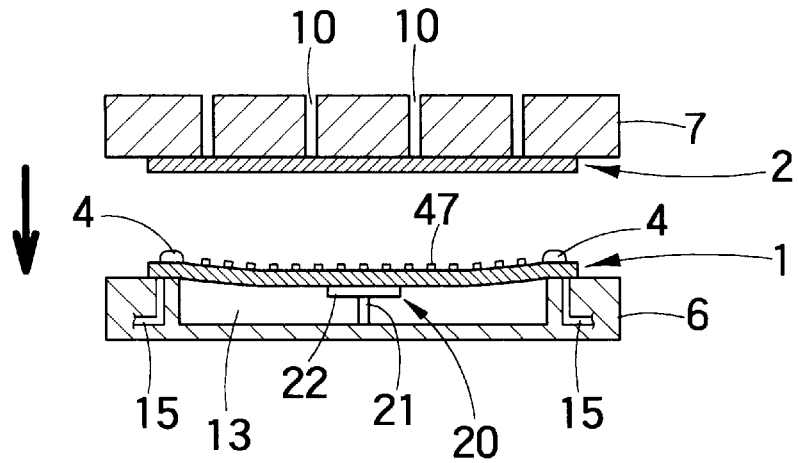
FIGS. 23(a) through 23(c) are sectional views showing a preferred embodiment of an assembling process according to the present invention.
Figure 23B:
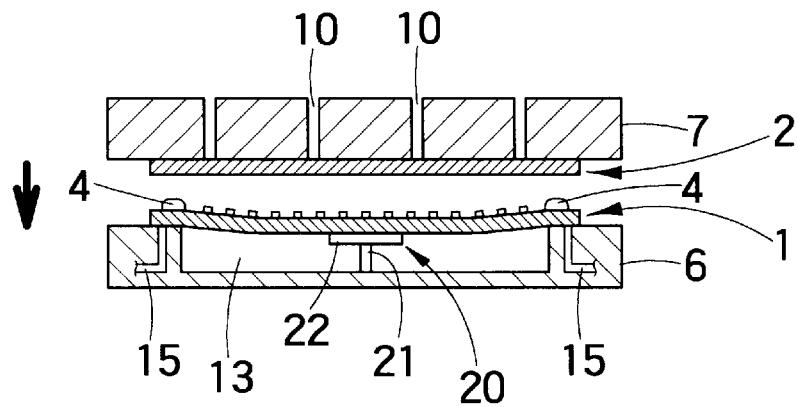

More specifically, the counter substrate 2 is vacuum held to the upper stage 7 of FIG. 3, and the array substrate 1 is put on the lower stage 6 (S2). The counter substrate 2 is put on the lower stage 6 so that the film surface of the counter substrate 2 faces downwards. At this time, the whole surface of the display area does not contact the lower stage 6 since the lower stage 6 is a so-called recessed stage. In this state, the alignment is carried out by means of a gauging pin. Thereafter, the upper stage 7 is moved downwards to vacuum hold the counter substrate 2, and lifts the counter substrate 2. Then, the array substrate 1 is put on the lower stage 6. Thus, the state schematically shown in FIG. 23(a) is obtained.

Then, the array substrate 1 is caused to approach the counter substrate 2 so that the distance between the substrates 1 and 2 is about 200 μm, and the first alignment is carried out. Subsequently, the distance between the substrates 1 and 2 is sequentially reduced to about half, and each time the alignment is carried out. This is a so-called multi-stage rough alignment (FIG. 23(b)).

Figure 23C:
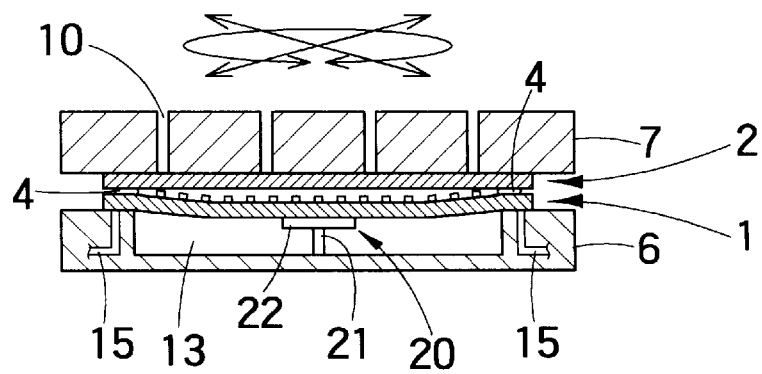

After such a rough alignment is carried out, the upper and lower substrates 2 and 1 are pressed on each other by means of the upper and lower stages 7 and 6 (S4) (FIG. 23(c)).

After this panel alignment is carried out, a fine alignment is carried out to compensate the displacement caused by the panel alignment (S5) (FIG. 23(c)).

Then, the temporary fixing resins 3 serving as the UV curing agents applied at step S1 are irradiated with ultraviolet light by means of UV lamps 9 to be cured to carry out a temporary fixing (S6).

Thereafter, the vacuum holding of the counter substrate 2 using the upper stage 7 is stopped, and only the upper stage 7 is moved upwards while the counter substrate 2 stands to release the vacuum holding (S7). The above described steps are carried out by means of the assembling apparatus.

Then, the sealing jig filling is carried out with respect to the pair of substrates 1 and 2 temporary fixed to each other (S8).

In this state, the sealing resin (sealing material) 4 is heated to be cured so that the sealing is carried out (S9).

The steps from assembly to sealing as described above and an apparatus for use in the steps will be described in more detail below.

First, the upper and lower stages 7 and 6 used at step S2 will be described. As shown in FIG. 3, the upper stage 7 for vacuum holding the counter substrate 2 is a so-called plate stage. The upper stage 7 has a plurality of suction ports 10. These suction ports 10 are communicated with each other in the upper stage 7 to be connected to one end of a suction tube 11, the other end of which is connected to a vacuum pump 12. As shown in FIG. 23(a), air is sucked into such an upper stage 7 via the suction ports 10 by means of the vacuum pump 12 to vacuum hold the counter substrate 2 positioned herein.

Figure 4:
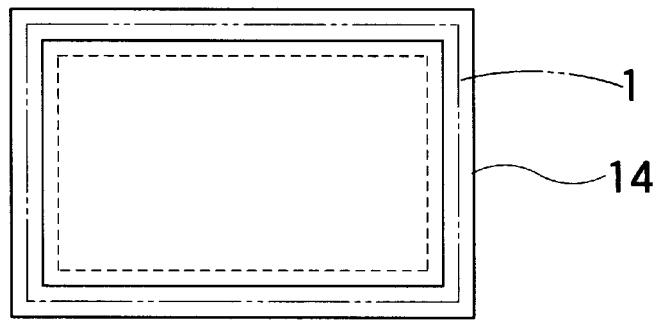
FIG. 4 is a plan view showing the positional relationship between a lower stage and an array substrate.

As can be seen from FIGS. 3 and 23, the lower stage 6 facing the upper stage 7 has a recessed portion 13 having a depth of 3 cm at the center thereof, and a peripheral portion 14, which surrounds the recessed portion 13 and which has a flat surface serving as a substrate holding surface 14a. The substrate holding surface 14a of the peripheral portion 14 has a plurality of suction ports 15. These suction ports 15 are communicated with each other in the peripheral portion 14 to be connected to one end of a suction tube 17, the other end of which is connected to a vacuum pump 18. A pushing-up stage 20 is provided substantially at the center of the recessed portion 13. The pushing-up stage 20 comprises a post 21 extending upwards from the bottom of the recessed portion 13, and a tabular pushing-up stage body 22 supported on the post 21. The height of the stage body 22 is set to be lower than that of the substrate holding surface 14a by about 1 to 50 μm. Although the array substrate 1 is put on the lower stage 6, the downward deflection of the array substrate 1 due to the weight of the array substrate 1 itself is reduced by means of the pushing-up stage 20 as less as possible. FIG. 4 shows the plan position relationship between the lower stage 6 and the array substrate 1 mounted thereon. In FIG. 4, the solid line shows the substrate holding surface 14 of the lower stage 6, and the two-dot chain line shows the outline of the array substrate 1. In addition, the broken line shows the sealing material (sealing resin) 4 for sealing the two panel-aligned substrates 1 and 2 in a so-called one chamfering.

FIGS. 5 and 6 show the counter substrate 2 and the array substrate 1, which are vacuum held to and mounted on the upper and lower stages 7 and 6, respectively. FIG. 5 shows the separated state before the two substrates 7 and 6 are assembled, and FIG. 6 shows the state after the two substrates 7 and 5 are assembled. First, in the lower array substrate 1, a semiconductor layer 32 of a polysilicon (or α-Si) is provided on a TFT portion on the side of the principal plane of a glass substrate 31, and a gate insulating film 33 is formed thereon. On the gate insulating film 33, a gate electrode 34 and an auxiliary capacitive line 35, which are formed at the same step, are provided. An insulating film 37 of a silicon oxide and a silicon nitride film 38 are sequentially formed thereon. On both sides of the gate electrode 34, a source electrode 39 and a drain electrode 40 are formed so as to pass through the silicon nitride film 38, the insulating film 37 and the gate insulating film 33 to reach the semiconductor layer 32. The drain electrode 40 is connected to signal lines (not shown).

In addition, a color filter layer 42, which is formed by sequentially arranging colored resins of R, G and B in the form of flat stripes, is deposited thereon. On the surface thereof, a pixel electrode 43 is formed. This pixel electrode 43 is connected to the source electrode 39 via a contact hole 45.

Furthermore, the auxiliary capacitive line 35 is electrically connected to the pixel electrode 43 to form a capacity Cs between the auxiliary capacitive line 35 and a layer, which is formed in the same layer as the semiconductor layer 32, via the gate insulating film 33.

To the array substrate 1, spacers 47 for maintaining the distance between the two substrates 1 and 2 are fixed, distance between adjacent two spacers 47 being predetermined distance. The spacer 47 comprises a square pole, which is made of a black resin obtained by mixing a resin with R, G and B and which has a diameter of about 20 μm. This spacer 47 is arranged above scanning lines, and coated with an alignment layer 48. By means of the spacers 47, the distance between the substrates 1 and 2 is maintained to be 3 to 4 μm.

The counter substrate 2 facing the array substrate 1 is obtained by sequentially forming a counter electrode 52 and an alignment layer 53 on a glass substrate 51. As shown in FIG. 6, a liquid crystal 54 is filled in a space between the two substrates 2 and 1.

Since the spacer 47 is fixed to the array substrate 1 as described above, there is some possibility that the spacer 47 makes scars on the alignment layer 53, which is formed on the inner surface of the counter substrate 2 facing the spacer 47, when the alignment of the two substrate 1 and 2 is carried out. The present invention has been made to eliminate this disadvantage. According to the present invention, the alignment of the two substrates 1 and 2 is carried out while maintaining the distance between the two substrate 1 and 2 to be greater than the cell gap when the two substrate are adhered to each other by sealing,. For example, during alignment, the array substrate 1 serving as the lower substrate is deflected slightly downwards to prevent the inner surface of the counter substrate 2 from being damaged by the tip of the spacer 47. Specifically, when the lower array substrate 1 is put on the lower stage 6, the array substrate 1 is deflected slightly downwards so as to correspond to the recessed portion 13, and excessive deflection is prevented by means of the pushing-up stage 20. If the alignment of the substrates 1 and 2 is carried out in this state, the alignment can be achieved while preventing the spacer 47 from making scars on the counter substrate 2 by the slightly downward deflection of the array substrate 1.

Furthermore, the term "cell gap" means the distance between two substrates in the case of a liquid crystal cell, and this is equal to the height of a spacer.

Thus, according to the above preferred embodiment, it is possible to prevent scars from being made on a counter substrate. In particular, when an alignment layer is formed on the inner surface of the counter substrate, the hardness of the alignment layer is weak, so that this preferred embodiment is effective. Because the hardness of an alignment layer of an organic film, such as a polyimide, is weaker than that of an inorganic film, such as ITO.

The alignment of the substrates 1 and 2 at steps S3 and S5 will be described below. In either step, the alignment is carried out as follows. Although the multistage alignment is carried out at step S3, this means that the following alignment steps are carried out a plurality of times while the two substrate 1 and 2 are sequentially caused to approach each other.

The counter substrate 2 is vacuum held to the upper stage 7, and the array substrate 1 is put on the lower stage 6. In this state, the above alignment is carried out by relatively moving the upper and lower stages 7 and 6, i.e., the two substrates 2 and 1.

Figure 8:
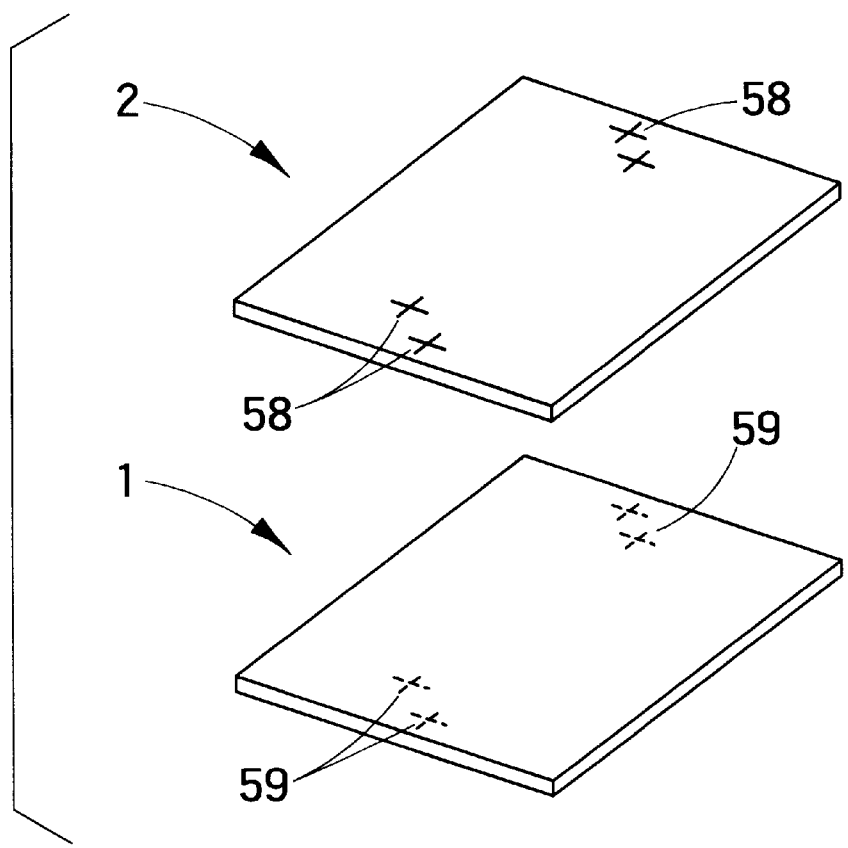
FIG. 8 is a perspective view showing alignment marks on two substrates.

Such alignment is carried out by relatively displacing the two substrates 1 and 2 while observing alignment marks 58 and 59, which are put on the two substrates 1 and 2, respectively, as shown in FIG. 8. In order to observe such marks, the assembling apparatus of FIG. 7 has the following construction.

That is, the upper stage 7 and the lower stage 6 have through holes (alignment holes) 55, 55 and 56, 56, respectively. Through the through holes 55, 55 and 56, 56, it is possible to observe the state that the alignment marks 58 and 59 of the two substrates 2 and 1 are superposed on each other. In order to optically carry out this observation, lamps 60, 60 for lighting are provided so as to face the through holes 55, 55 of the upper stage 7, and cameras 61, 61 are provided below the through holes 56, 56 of the lower stage 6.

Figure 9:
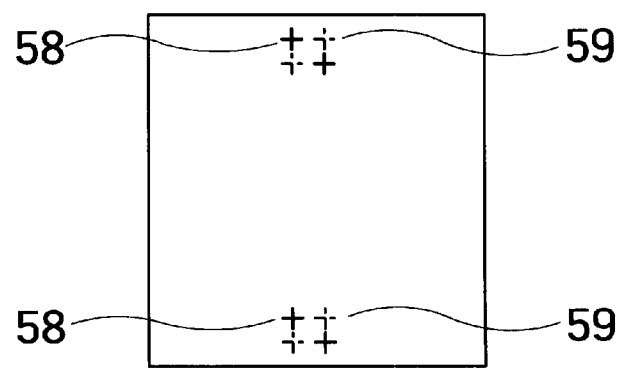
FIG. 9 is a plan view showing the state that alignment marks of two substrates are superposed on each other.
Figure 10A:
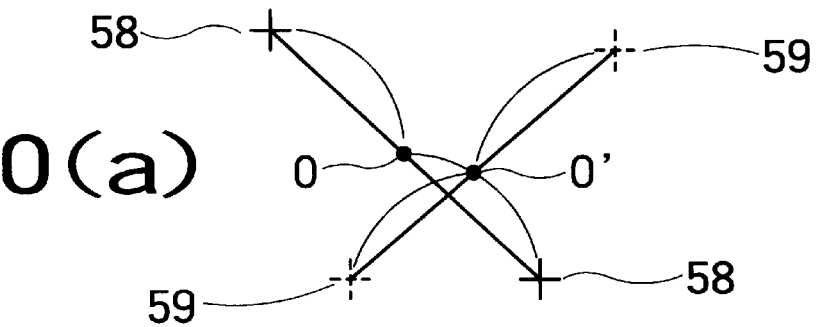
FIGS. 10(a), 10(b) and 10(c) are explanatory drawings for explaining alignment.
Figure 10B:
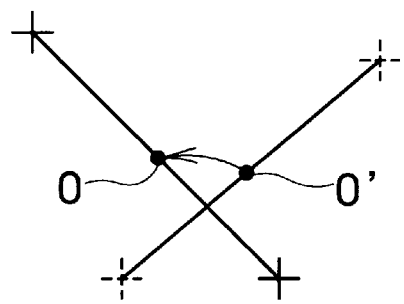
Figure 10C:
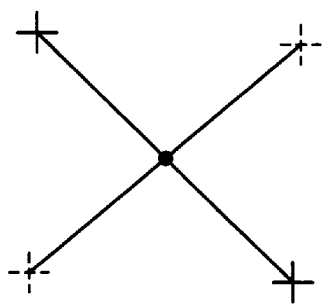

As can be seen from FIG. 7, the counter substrate 2 is vacuum held to the upper stage 7, and the array substrate 1 is put on the lower stage 6. In this stage, the lamps 60, 60 are turned on. The images of the upper and lower alignment marks 58 and 59 superposed by the lamps 60, 60 are transmitted to the cameras 61, 61 through the alignment holes 56, 56. As can be seen from FIG. 8, these images are formed as shown in FIG. 9 by superposing the alignment marks 58 of the upper counter substrate 2 on the alignment marks 59 of the lower array substrate 1. As can be seen from FIGS. 10(a) through 10(c), the alignment is carried out by superposing the center O of the alignment marks 58, 58 of the upper substrate 2 on the center O' of the alignment marks 59, 59 of the lower substrate 1.

Figure 11:
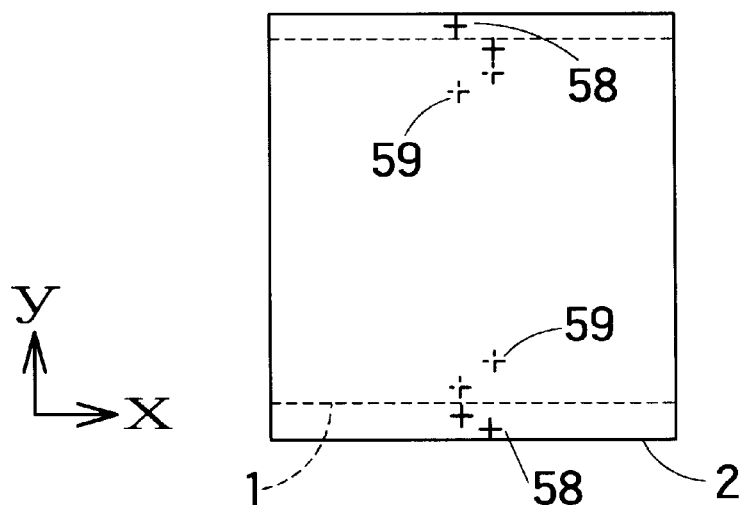
FIG. 11 is an explanatory drawing showing the state of the superposed alignment marks of two substrates having different size.
Figure 12:
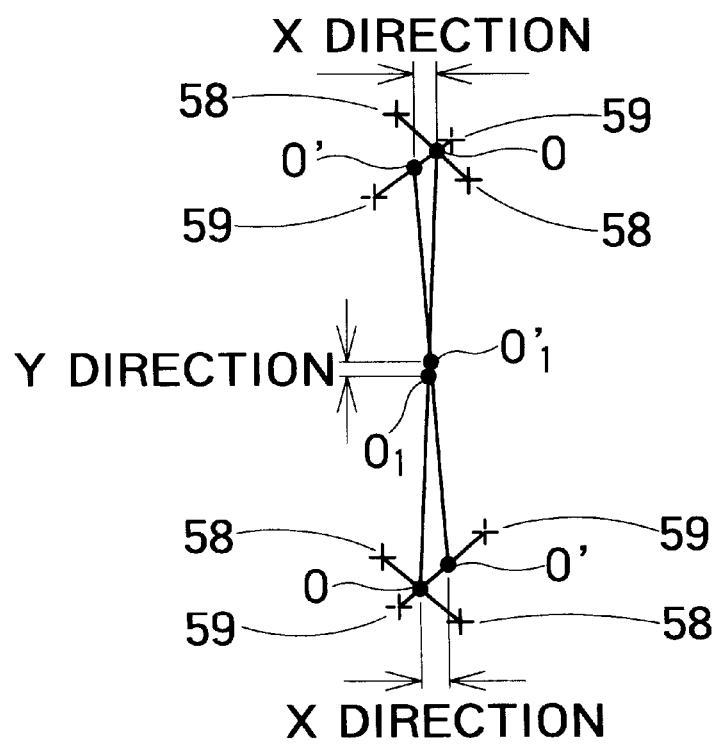
FIG. 12 is an explanatory drawing for explaining an alignment method in the case of FIG. 11.

The above described method can be used in the case where the sizes of the upper counter substrate 2 and the lower array substrate 1 are the same, i.e., the total pitches thereof are the same. When the total pitches are different, the alignment can not be carried out by the above method, so that the alignment is carried out by the following method. That is, when the total pitches of the two substrates 1 and 2 are not the same, the images of two sets of alignment marks, which are to be formed by superposing the alignment marks on each other, are shown in FIG. 11. In this case, as shown in FIG. 12, the alignment in x directions is carried out by the above method, and the alignment in y directions is carried out by superposing the centers of the two substrates on each other. That is, with respect to the x directions, the center O of the alignment marks 58, 58 of the upper substrate 2 and the center O' of the alignment marks 59, 59 of the lower substrate 1 are arranged lengthwise so that the x-coordinate of the center O is the same as that of the center O'. With respect to the y directions, the center $O_1$ of a line, which is drawn between the centers O and O of the two sets of alignment marks 58, 58 and 58, 58 of the upper substrate 2, and the center $O_1'$ of a line, which is drawn between the centers O' and O' of the two sets of alignment marks 59, 59 and 59, 59 of the lower substrate 1, are arranged widthwise so that the y-coordinate of the center $O_1$ is the same as that of the center $O_1'$.

Figure 13:
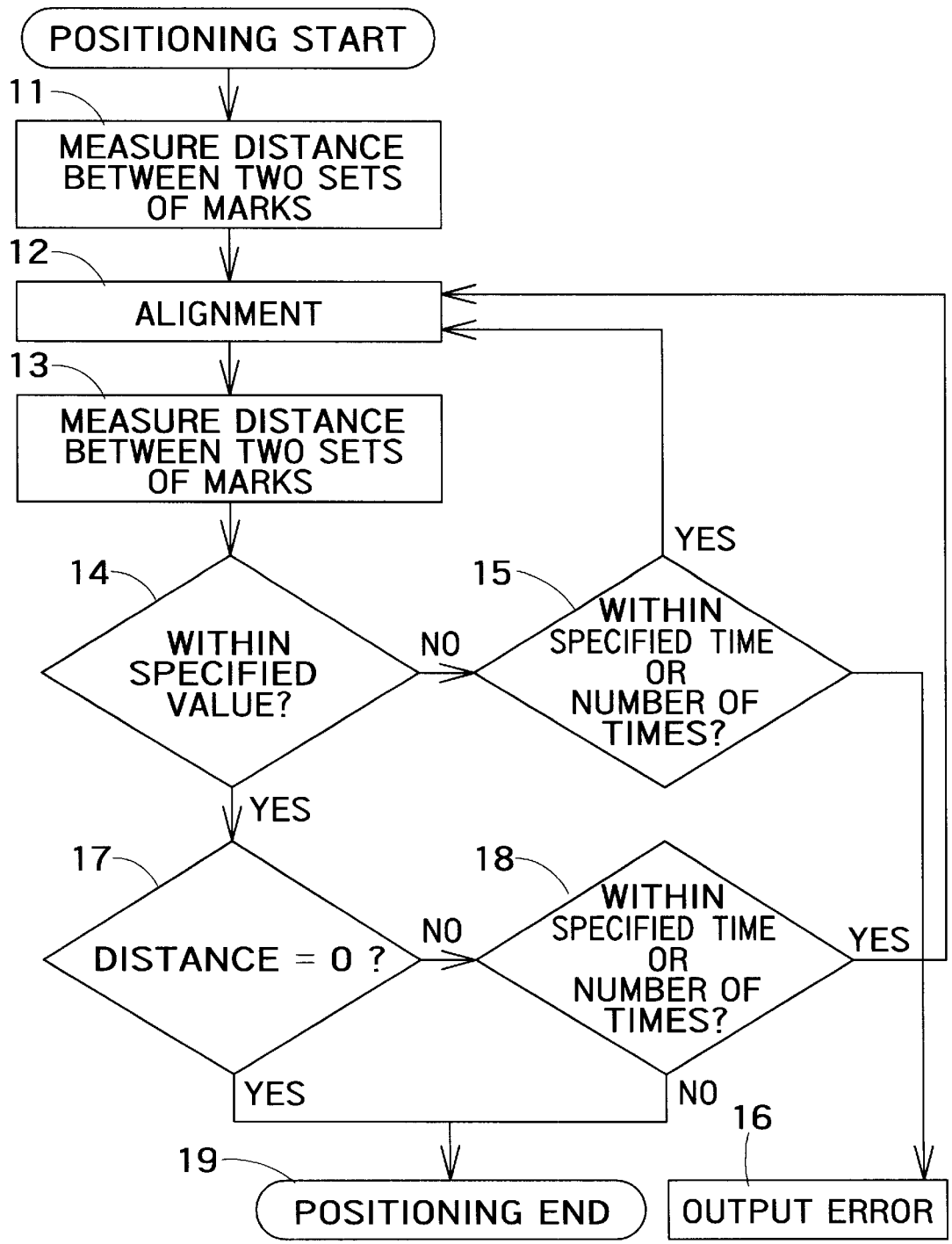
FIG. 13 is a flow chart for explaining the operation of alignment.

The above described alignment is carried out in accordance with the flowchart of FIG. 13. However, the two sets of marks herein indicate the centers O, O' in FIG. 10, and the centers O, O' as well as the centers $O_1$, $O_1'$ in FIG. 12. In accordance with the flowchart of FIG. 13, the alignment will be described below. That is, the marks O, O', $O_1$, $O_1'$ on the array substrate 1 and the counter substrate 2 are read by means of the cameras 61 serving as sensors to measure the distances between the marks, i.e., the displacement amounts.

That is, when the alignment of the array substrate 1 and the counter substrate 2 is started, the displacement amount between the array substrate 1 and the counter substrate 2 is first measured as described above (step 11). Then, in order to remove the displacement amount on the basis of the measured distance, the alignment is carried out by moving and rotating the upper counter substrate 2 in X, Y and θ (step 12).

Even if such alignment is carried out, the fine displacement between the array substrate 1 and the counter substrate 2 is caused by the back crush or the like in the X, Y and θ drive mechanisms. Therefore, the displacement amount between the array substrate 1 and the counter substrate 2 is measured again (step 13). Then, it is determined whether the displacement amount between the array substrate i1 and the counter substrate 2 is within a specified range (step 14). When the displacement amount is out of the specified range, it is determined whether the alignment operation has been carried out for a preset operating time or repeated the preset number of times (step 15). When it does not, the alignment operation (step 12) is repeated.

Thereafter, the steps 13 and 14 are repeated again. When the displacement amount between the array substrate 1 and the counter substrate 2 remains being within the prescribed range, the steps 12 through 14 are repeated until it is determined at step 15 that the alignment operation has been carried out for the preset operating time or repeated the preset number of times.

Then, even if the alignment operation has been carried out for the present operating time or repeated the present number of times, if the displacement amount between the substrates is beyond the preset range, this means that the alignment has not normally carried out, so that an error message is outputted (step 16) and the alignment operation ends.

On the other hand, when the displacement amount between the array substrate 1 and the counter substrate 2 is within the prescribed range (step 14) after the alignment operation is carried out at step 12, it is determined whether the displacement amount between the array substrate 1 and the counter substrate 2 is zero (step 17). When it is not zero, it is determined whether the alignment operation has been carried out for the preset operating time or repeated the preset number of times (step 18). It is determined at step 18 that the alignment operation has not been carried out for the present operating time or repeated the present number of times, the alignment operation (step 12) is repeated. At this time, the displacement amount being within the prescribed range is inputted as information.

Unless the displacement amount is zero, this alignment operation is repeated until it is determined at step 18 that the alignment operation has been carried out for the preset operating time or repeated the preset number of times. That is, the displacement amount approaches zero each time the alignment operation is repeated. Then, when the displacement amount is zero, or when the alignment operation has been carried out for the present operating time or repeated the preset number of times even if the displacement amount is not zero, the alignment operation normally ends (step 19).

Thus, after the displacement amount between the array substrate 1 and the counter substrate 2 reaches zero, or after the alignment operation is carried out for the preset operating time or repeated the preset number of times even if the displacement amount is not zero, the routine ends.

In order to carry out the temporary fixing curing at step S6 of FIG. 1, four UV lamps 9 facing upwards are provided bellow four corners of the lower stages as can be seen from FIG. 7. In order to introduce the UV light from the lamps 9 into the UV curing agent (temporary fixing agent) 3 applied on the array substrate 1 on the lower stage 6 to allow the UV curing agent to be irradiated with the UV light, four temporary curing holes 63 are formed in the lower stage 7. Furthermore, the lamps 9, 60 and the cameras 61 are supported on optical fibers or the like.

Referring to the accompanying drawings, the second preferred embodiment of the present invention will be described in detail below.

Figure 14:
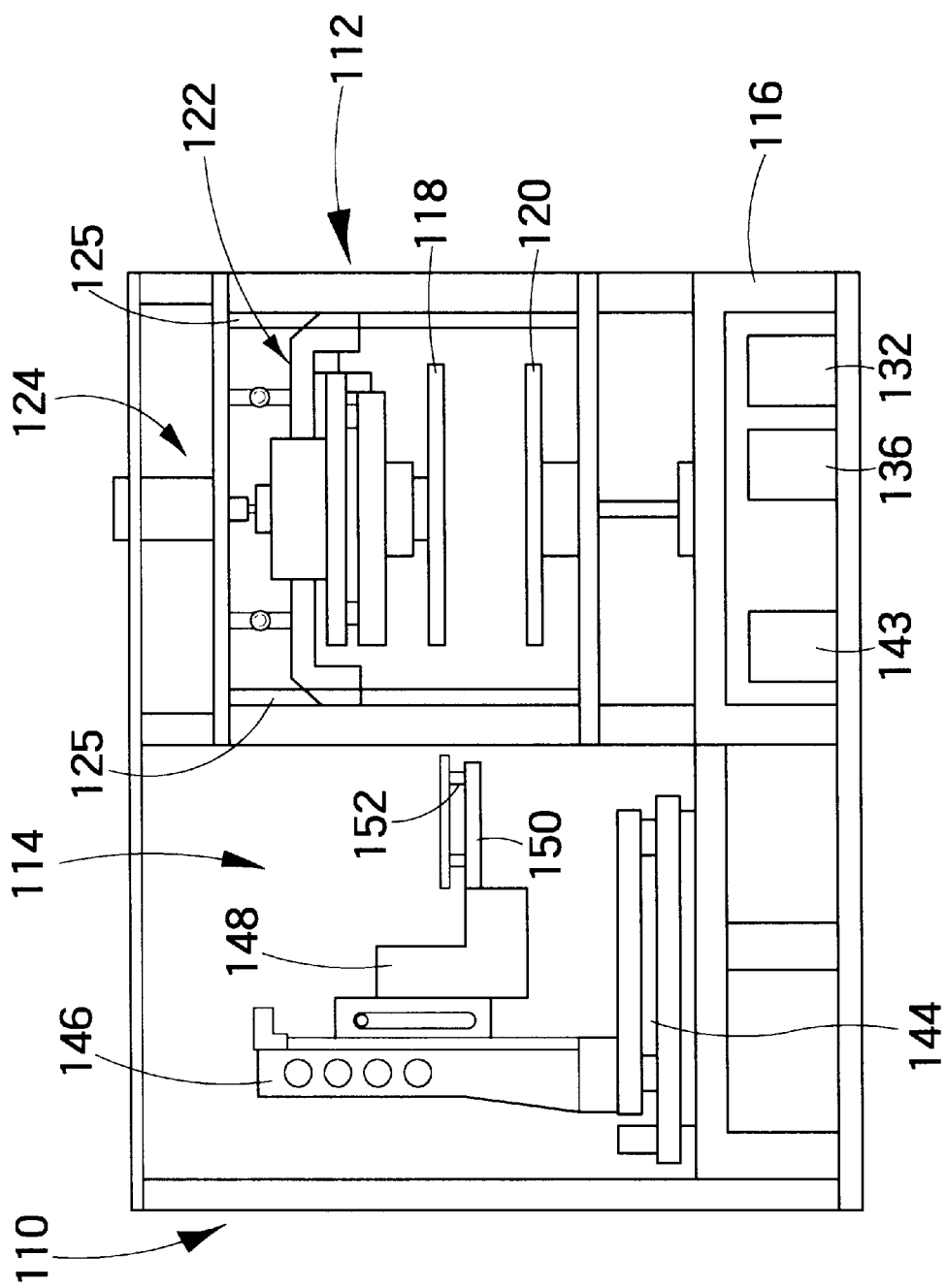
FIG. 14 is a side view of a preferred embodiment of an assembling apparatus according to the present invention.

FIG. 14 shows the second embodiment of an assembling apparatus 110 for assembling a crystal liquid display as a flat panel display according to the present invention. In this preferred embodiment, the assembling apparatus has the same structure except for the shape of upper and lower stages. The assembling apparatus comprises a panel alignment mechanism 112 for carrying out the panel alignment of two glass substrate of a liquid crystal display, which will be described later, and a supply mechanism 114 for supplying the glass substrates to the panel alignment mechanism 112. The panel alignment mechanism 112 and the supply mechanism 114 are provided on a body frame 116.

The panel alignment mechanism 112 has an upper stage 118 and a lower stage 120, which are arranged so as to face each other. These stages 118 and 120 have a rectangular shape and are arranged so as to extend in substantially horizontal directions. The lower stage 120 is fixed to the body frame 116.

The upper stage 118 is mounted on an X-Y-θ stage 122 serving as a position adjusting mechanism. The X-Y-θ stage 122 is movable on a horizontal plane in X and Y directions, and rotatable on its vertical axis. The X-Y-θ stage 122 is supported and guided by a guide 125, which is provided on the body frame 116, so as to be movable in vertical directions. The X-Y-θ stage 122 is moved in vertical directions by means of a drive mechanism 124 provided on the upper portion of the body frame 116.

The position of the upper stage 118 with respect to the lower stage 120 can be adjusted by operating the X-Y-θ stage 122. The upper stage 118 can be moved so as to approach and go away from the lower stage 120 by moving the X-Y-θ stage 122 by means of the drive mechanism 124.

Figure 15A:
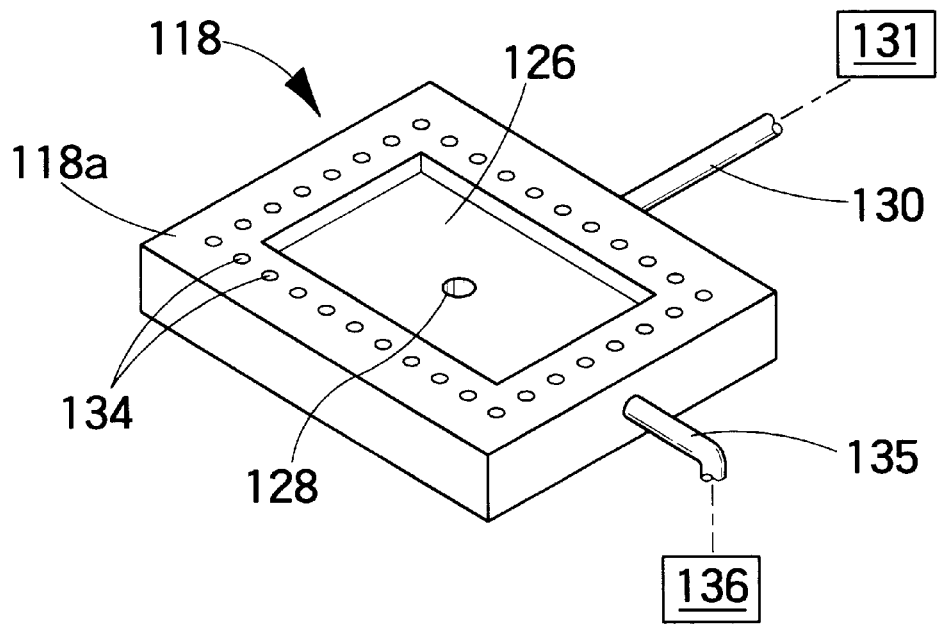
FIGS. 15(a) and 15(b) are perspective views of the upper and lower stages of the assembling apparatus of FIG. 14, respectively.

As shown in FIG. 15(a), the lower surface of the upper stage 118 forms a substrate holding surface 118a. At the central portion of the substrate holding surface 118a, a rectangular recessed portion 126 is formed. The recessed portion 126 has a shape and size, which substantially correspond to those of an effective region of a glass substrate, which will be described later. The depth of the recessed portion 126 is not less than 50µm. Moreover, at the center of the bottom of the recessed portion 126, an exhaust port 128 is formed. The exhaust port 128 is connected to a first vacuum pump 131 via a suction tube 130.

The upper stage 118 has a plurality of vacuum holding holes 134. These vacuum holding holes 134 are open to the substrate holding surface 118a, and arranged along the peripheral portion surrounding the recessed portion 126. The vacuum holding holes 134 are connected to a second vacuum pump 136 via a suction tube 135.

Figure 15B:
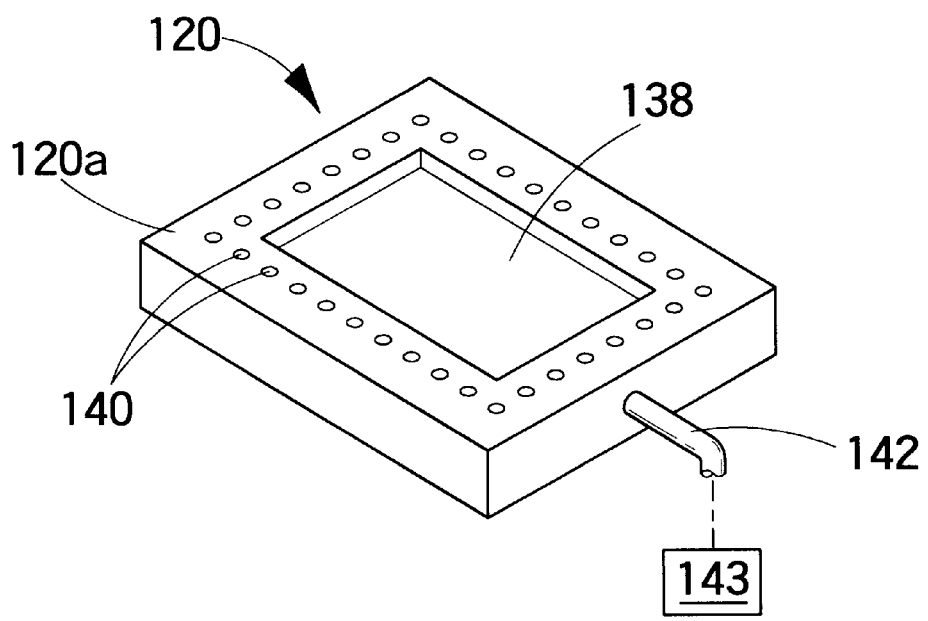

As shown in FIG. 15(b), the upper surface of the lower stage 120 forms a substrate holding surface 120a. At the central portion of the substrate holding surface 120a, a rectangular recessed portion 138 is formed. The recessed portion 138 has a shape and size, which substantially correspond to those of an effective region of a glass substrate, which will be described later. In addition, the upper stage 120 has a plurality of vacuum holding holes 140. These vacuum holding holes 140 are open to the substrate holding surface 120a, and arranged along the peripheral portion surrounding the recessed portion 138. The vacuum holding holes 140 are connected to a third vacuum pump 143 via a suction tube 142.

Furthermore, the first through third vacuum pumps 131, 136 and 143 are arranged on the body frame 116 below the lower stage 120 as shown in FIG. 14, and serve as vacuum holding means and suction means.

As shown in FIG. 14, the supply mechanism 114 for supplying glass substrates to the upper stage 118 and the lower stage 120 in the panel alignment mechanism 112, comprises: an X-Y table 144 provided on the body frame 116 so as to extend substantially in horizontal directions; a supporting post 146 provided on the X-Y table 144 so as to extend in vertical directions; a movable carriage 148, which is mounted on the supporting post 146 and which is movable in vertical directions; a horizontally extending supporting arm 150, which is mounted on the movable carriage 148 and which is retractable and rotatable; and a holding portion 152, provided on the extending end portion of the supporting arm 150, for vacuum holding a glass substrate.

The supply mechanism 114 supplies a glass substrate to the upper and lower stages 118 and 120 by moving the movable carriage 148 in vertical directions and stretching, retracting and rotating the supporting arm 150 while the glass substrate is vacuum held to the holding portion 152.

Figure 16A:
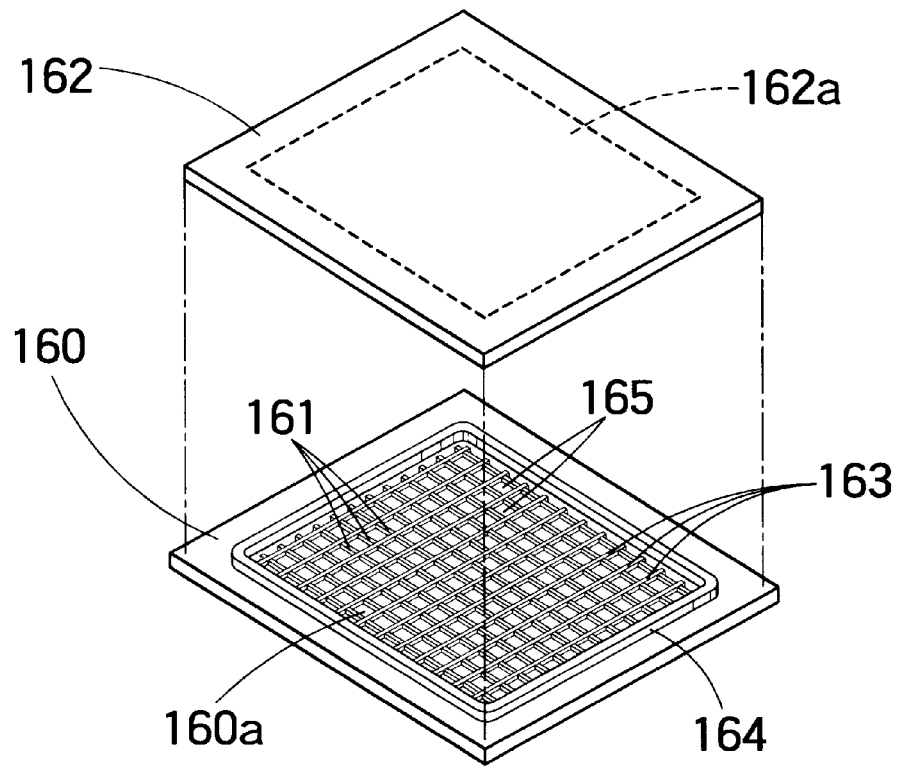
FIG. 16(a) is an exploded perspective view of a liquid crystal display assembled by the assembling apparatus of FIG. 14.
Figure 16B:
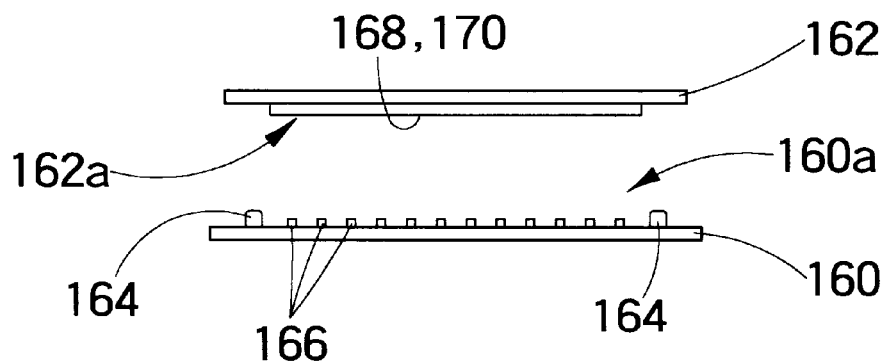
FIG. 16(b) is a side view thereof.

As shown in FIG. 16, a liquid crystal display, which is assembled by the assembling apparatus with the above construction, comprises an array substrate 160 and a counter substrate 162, which are rectangular transparent substrates. The array substrate 160 has a rectangular display region 160a, which is obtained by forming signal lines 161, scanning lines 163, pixel electrodes 165 and so forth on the surface of a glass substrate. On the array substrate 160, a sealing material 164 is applied so as to surround the display region 160a. On the display region 160a, a plurality of spherical spacers 166 are arranged at random. The height of the sealing material 164 is set to be about 30 to 50 µm before it is deformed, and the diameter of each of the spacers is set to be about 5 µm. That is, the height of the sealing material 164 is about 30 to 50 μm when being applied on the array substrate 160, about 12 to 20 μm immediately after assembly, and 5.5 μm after the sealing material is cured.

The counter substrate 162 is made of a glass substrate. On the lower surface of the counter substrate 162, a rectangular display region 162a is formed. On the display region 162a, a counter electrode 168, a color filter 170 and so forth are formed. The size of the display region 162a corresponds to that of the display region 160a of the array substrate 160.

The panel alignment of the array substrate 160 and the counter substrate 162 via the sealing material 164 is carried out, and a liquid crystal molecule is filled in a space between the substrates, so that a liquid crystal display is formed.

A method for assembling a liquid crystal display using the assembling apparatus with the above construction will be described below.

Figure 17A:
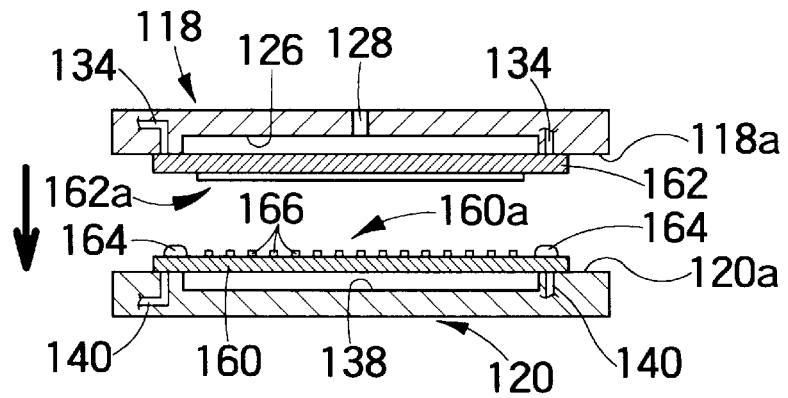
FIGS. 17(a) through 17(d) are sectional views showing a preferred embodiment of a process for assembling a liquid crystal display by means of the assembling apparatus of FIG. 14.

First, the step of getting the state shown in FIG. 17(a) will be described. The counter substrate 162 is put on the lower stage 120 so that the film surface of the counter substrate 162 faces downwards. At this time, the display area does not contact the lower stage 120 since the lower stage 120 is a so-called concave stage. In this state, the alignment is carried out by means of a gauging pin. Then, the upper stage 118 moves downwards to vacuum hold and lift the counter substrate 162. Then, as shown in FIG. 17(a), the previously formed array substrate 160 is fed to the lower stage 120 in the panel alignment mechanism 112 by means of the supply mechanism 114, and put on the lower stage 120 so that the display region 160a faces upwards. At this time, the display region 160a of the array substrate 160 faces the recessed portion 138 of the lower stage 120, and the peripheral portion of the array substrate 160 contacts the substrate holding surface 120a. In this state, the third vacuum pump 143 operates to cause the substrate holding surface 120a of the lower stage 120 to vacuum hold the peripheral portion of the array substrate 160 by means of the vacuum holding holes 140. At this time, the central portion of the array substrate 160 is deflected by its weight.

Subsequently, the counter substrate 162 is supplied to the upper stage 118 by the same process as the above described process, and vacuum held to the substrate holding surface 118a of the upper stage 118 so that the effective region 162a faces downwards. In this case, the display region 162a of the counter substrate 162 faces the recessed portion 126 of the upper stage 118, and the peripheral portion of the counter substrate 162 contacts the substrate holding surface 118a. In this state, the second vacuum pump 136 operates to cause the substrate holding surface 118a to vacuum hold the peripheral portion of the counter substrate 162 by means of the vacuum holding holes 134. Thus, the array substrate 160 and the counter substrate 162 are arranged so that the display regions 160a and 162a face each other.

Figure 17B:
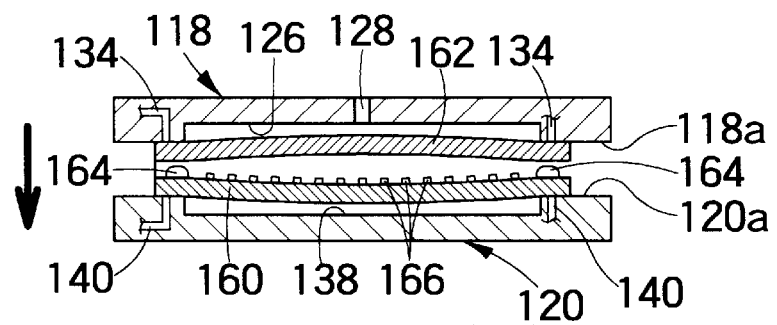

Subsequently, as shown in FIG. 17(b), the upper stage 118, together with the X-Y-θ stage 122, is moved downwards by means of the drive mechanism 124, so that the counter substrate 162 is moved so as to approach the array substrate 160. During this movement, the first vacuum pump 132 operates to evacuate the recessed portion 126 of the upper stage 118 to a predetermined pressure via the exhaust port 128. Then, the display region 162a of the counter substrate 162 is attracted toward the bottom of the recessed portion 126 to be finely deflected so as to go away from the array substrate 160. The deflection amount of the counter substrate 160 is adjusted to be a predetermined value, e.g., about 50 μm, by controlling the exhaust pressure.

Figure 17C:
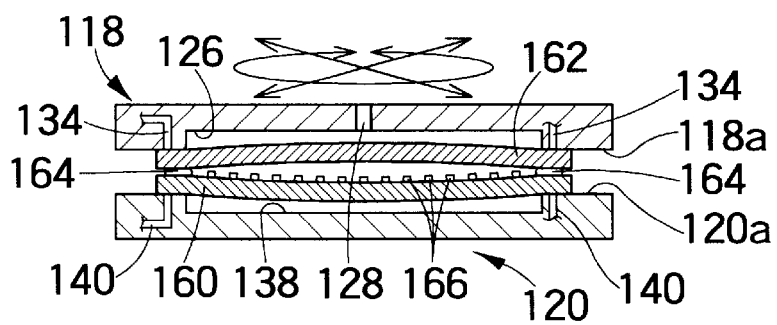

Then, as shown in FIG. 17(c), while the counter substrate 162 is deflected by a predetermined amount, the upper stage 118 is moved more downwards to a position at which the peripheral portion of the counter substrate 162 contacts the sealing material 164 on the array substrate 160. At this time, since the display region 162a of the counter substrate 162 is deflected so as to be go away from the display region 160a of the array substrate 160, the display region 162a is held without contacting the spacers 166 on the array substrate 160.

In this state, the X-Y-θ stage 122 operates to move the upper table 118 and the counter substrate 162 in the X, Y and θ directions so that the upper table 118 and the counter substrate 162 are positioned at predetermined positions.

Figure 17D:
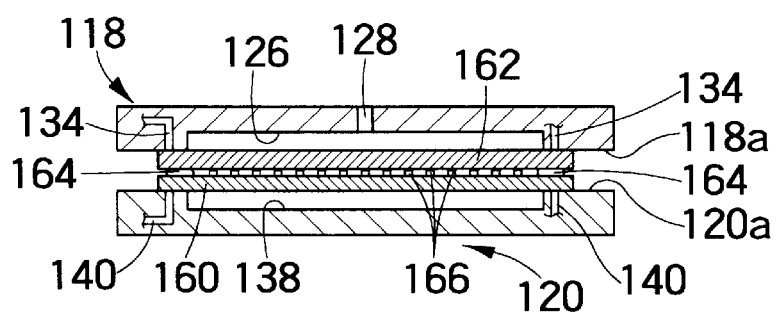
Figure 18A:
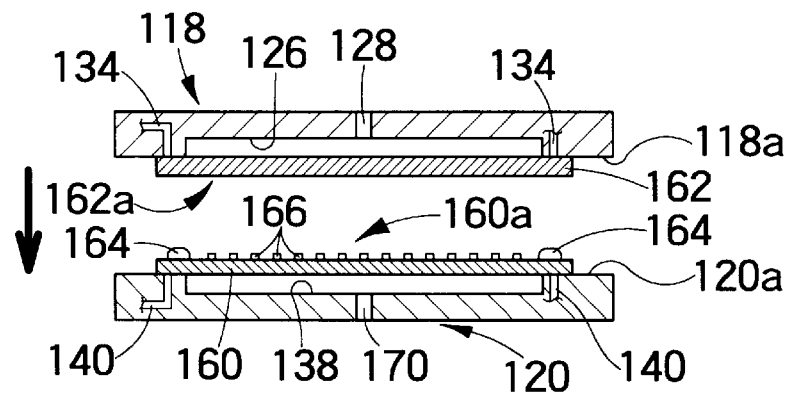
FIGS. 18(a) through 18(d) are sectional views schematically showing another preferred embodiment of a process for assembling a liquid crystal display according to the present invention.
Figure 18B:
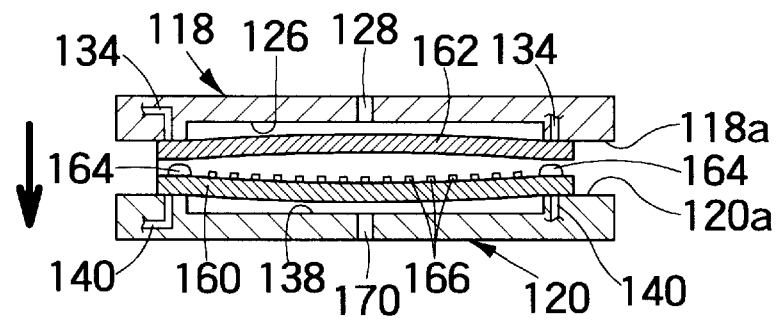
Figure 18C:
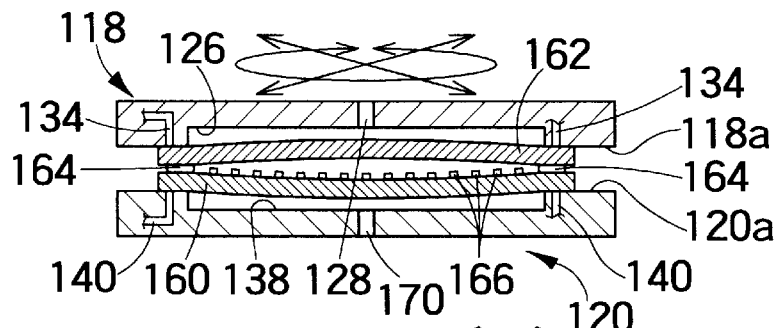
Figure 18D:
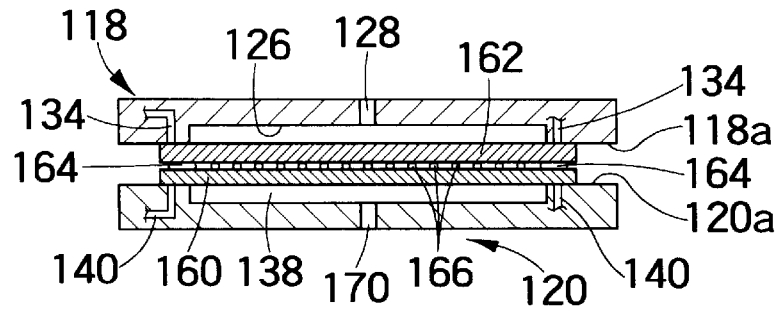

After positioning, as shown in FIG. 17(d), the fist vacuum pump 132 is stopped, and the pressure in the recessed portion 126 of the upper stage 118 is restored to atmospheric pressure. Thus, the deflection of the counter substrate 162 is removed, so that the counter substrate 162 returns to the original state, i.e., the flat state. Consequently, the display region 162a of the counter substrate 162 contacts the spacers 166 on the array substrate 160, and the panel alignment of the counter substrate 162 and the array substrate 160 is carried out while maintaining a predetermined gap, e.g., 5 μm, between the counter substrate 162 and the array substrate 160.

At this time, a pressurized air may be supplied to the recessed portion 126 from the exhaust port 128 of the upper stage 118 to correct the gap between the array substrate 160 and the counter substrate 162.

After or when the panel alignment is completed, the temporary fixing of the array substrate 160 to the counter substrate 162 is carried out by means of a temporary fixing agent, such as an UV curing agent, while pressing the array substrate 160 on the counter substrate 162.

Thereafter, the second and third vacuum pumps 136 and 143 are stopped to release the vacuum holding between the array substrate 160 and the counter substrate 162, and the upper stage 118, together with the X-Y-θ state 122, is moved more upwards. Subsequently, the array substrate 160 and the counter substrate 162, which are panel aligned with each other, are ejected from the lower stage 120 by means of a conveying mechanism (not shown). Then, the array substrate 160 and the counter substrate 162 are conveyed to a process for curing the sealing material.

According to the liquid crystal display assembling method and apparatus with the above construction, the display region 162a of the counter substrate 162 is deflected so as to go away from the array substrate 162, so that the positioning is carried out while only the peripheral portion of the counter substrate 162 contacts the array substrate 160 via the sealing material 164. Therefore, the positioning can be carried out while the display region of the counter substrate 162 does not contact the spacers 166. In addition, since the substrate holding surface 120a of the lower stage 120 also has the recessed portion 138, it is possible to prevent the effective region 160a of the array substrate 160 from being deflected toward the counter substrate 162 due to contamination or the like adhered to the substrate holding surface. Simultaneously, the effective region 160a of the array substrate 160 is slightly deflected toward the recessed portion 138 by its weight to be spaced from the counter substrate 162.

Therefore, it is possible to prevent the spacers 166 from making scars on the display regions 160a and 162a of the array substrate 160 and the counter substrate 162 during positioning. As a result, it is possible to prevent bad alignment and bad image due to the scars to provide a liquid crystal display having improved picture quality. Moreover, since the positioning is carried out while the array substrate 160 and the counter substrate 162 do not contact each other via the spacers 166, it is possible to achieve accurate positioning, so that it is possible to more improve the picture quality.

Furthermore, since the positioning of the glass substrates is carried out while the counter substrate 162 is deflected, it is conceived that displacement corresponding to the deflection occurs when the deflection of the counter substrate is removed after the positioning is completed. However, when the deflection amount of the counter substrate 162 is about 50 μm, the displacement amount is about 0.02 to 0.05 μm even in the case of a usual glass substrate of 300×300 mm, so that there is no problem for practical use.

FIG. 18 schematically shows the third preferred embodiment of an assembling apparatus and method according to the present invention. According to the second preferred embodiment, an exhaust port 70 is also provided in the recessed portion 138 of the lower stage 120, and the exhaust port 70 is connected to a fourth vacuum pump (not shown). In this case, the recessed portion 138 has a depth of not less than 50 μm.

Similar to the above described preferred embodiment, after the counter substrate 162 and the array substrate 160 are vacuum held to the upper stage 118 and the lower stage 120, respectively, the first and fourth vacuum pumps operate to cause the effective region 162a of the counter substrate 162 and the effective region 160a of the array substrate 160 to be deflected so as to go away from each other. The displacement amounts of both substrates are set to be the same value.

In this state, after the panel alignment of the peripheral portions of the counter substrate 162 and the array substrate 160 via the sealing material 164 is carried out, the positioning of the substrates is carried out by means of the X-Y-θ stage 122. Thereafter, the first and fourth vacuum pumps are stopped to restore the pressures in the recessed portions 126 and 138 to atmospheric pressure to remove the deflection of the counter substrate 162 and the array substrate 160. Thus, the counter substrate 162 and the array substrate 160 contact each other via the spacers 166, and the panel alignment thereof is carried out while the substrate are spaced from each other at an interval.

Furthermore, other structures are the same as those of the above described preferred embodiment, so that the same reference numbers are used for the same portions to omit the detailed descriptions thereof.

With this construction, the second and third preferred embodiments can have the same advantages as those of the first preferred embodiment. In addition, after two glass substrates are positioned while the substrates are deflected by the same amount, the deflection is removed. Therefore, the displacement in positioning caused by the deflection can be substantially zero.

FIGS. 19 through 22 show modifications of the upper and lower stages 118 and 120.

Figure 19A:
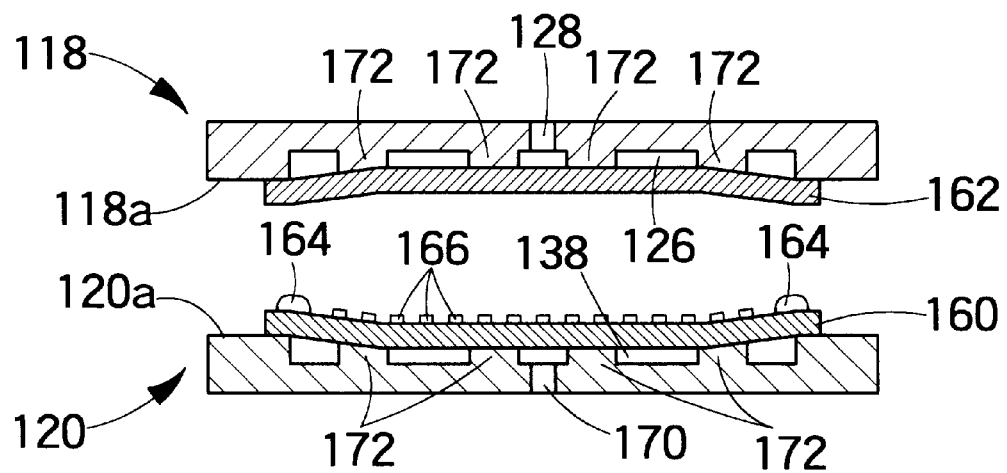
FIGS. 19(a) and 19(b) are sectional and perspective views showing a first modification of the upper and lower stages.
Figure 19B:
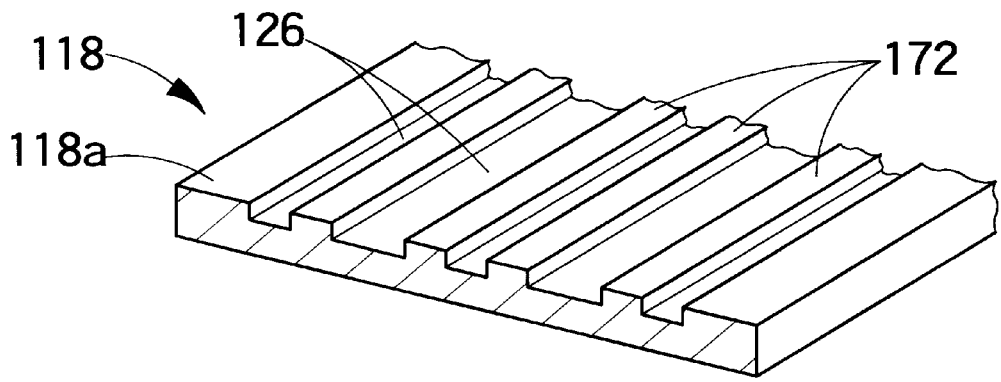

In a first modification shown in FIGS. 19(a) and 19(b), a plurality of elongated ribs 172 extending in parallel to each other are formed on the bottom of each of the recessed portions 126 and 138 of the upper and lower stages 118 and 120. The height of each of the ribs 172 is set to be, e.g., 50 μm.

In the first modification, the counter substrate 162 and the array substrate 160 are deflected toward the facing bottoms of the recessed portions 126 and 138 by evacuating the recessed portions 126 and 138 by a predetermined pressure, so that the counter substrate 162 and the array substrate 160 are maintained so as to contact the upper surfaces of the facing ribs 172. With this construction, it is possible to always maintain the deflection amount of the glass substrate to be constant, so that it is possible to easily control the exhaust pressure.

Figure 20:
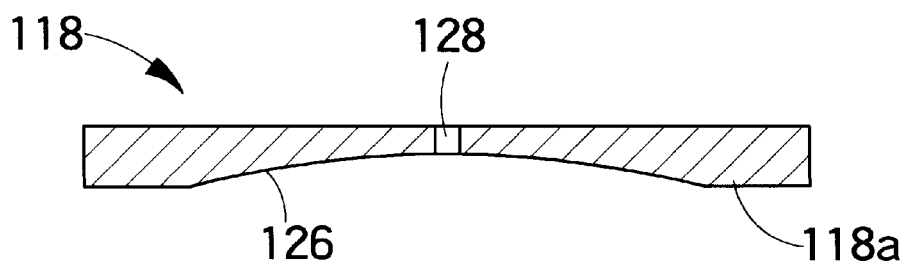
FIG. 20 is a sectional view showing a second modification of the upper and lower stages.
Figure 21:
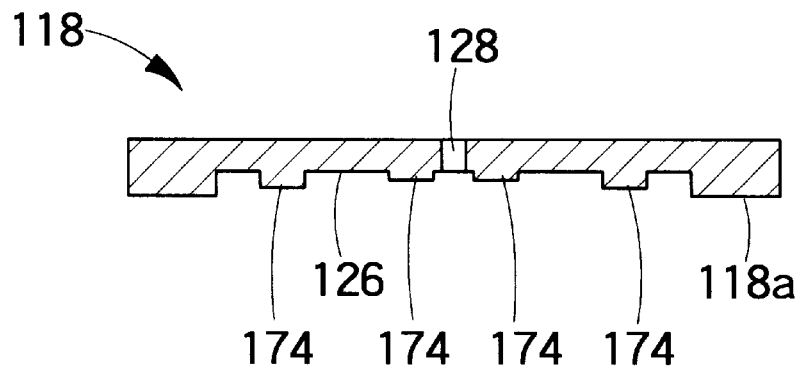
FIG. 21 is a sectional view showing a third modification of the upper and lower stages.

In a second modification shown in FIG. 20, the bottoms of the recessed portions 126 and 138 of the respective stages are formed so as to have a gentle sphere continuously extending from the substrate holding surface of the corresponding stage. With this construction, it is possible to prevent the deflection of the glass substrate from concentrating on the boundary between the substrate holding surface and the recessed portion of the stage when the glass substrate is deflected. Thus, it is possible to prevent the vacuum holding of the peripheral portion of the glass substrate from being removed to prevent the peripheral portion from being raised.

It is very difficult to work the above recessed portion having a spherical bottom surface. Therefore, as a third modification shown in FIG. 21, a plurality of elongated ribs 172 extending in parallel to each other may be formed on the bottom of the recessed portion to form a pseudo curved surface by gradually increasing the height of the ribs as approaching the peripheral portion of the recessed portion from the central portion of the recessed portion, at which the height of the rib is lowest.

Figure 22:
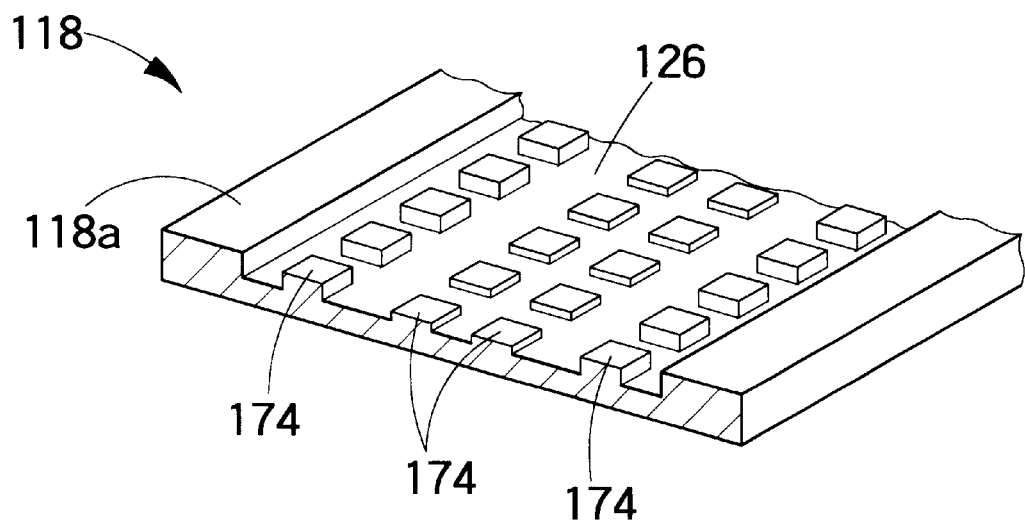
FIG. 22 is a perspective view showing a fourth modification of the upper and lower stages.

Alternatively, as a fourth modification shown in FIG. 22, a plurality of separate prismatic projections 74 may be formed on the bottom of the recessed portion in place of the ribs to form a pseudo curved surface by gradually increasing the height of the projections as approaching the peripheral portion of the recessed portion from the central portion of the recessed portion, at which the height of the projection is lowest.

Also in a case where any one of the first through fourth modifications of a stage with the above construction is used, the same advantages as those of the above described preferred embodiments can be obtained. In addition, when any one of these modifications of a stage is used, the glass substrate is held so as to contact the ribs 172, the bottom of the recessed portion, or the projections 74 while the glass substrate is deflected. Therefore, it is possible to omit the exhaust system, which vacuum holds the peripheral portion of the glass substrate to the substrate holding surface of the stage, to vacuum hold the glass substrate by only the exhaust system for deflecting the glass substrate.

Furthermore, the present invention should not be limited to the above described preferred embodiments and modifications, but the invention can be embodied in various ways without departing from the principle of the invention. For example, the shape and size of the recessed portions of the upper and lower stages, the size of the glass substrate or the like may be modified if necessary. In addition, the present invention should not be limited to the assembly of a liquid crystal display having spherical spacers, but the invention may be applied to the assembly of a liquid crystal display having prismatic spacers formed by the lithography process so as to project from the effective region.

In the above preferred embodiments, the panel alignment of the array substrate and the counter substrate via the sealing material is carried out while at least one of the array substrate and the counter substrate is deflected, and then, the positioning of the substrates is carried out by moving one of the substrates. However, the present invention should not be limited thereto, but the invention may be applied to the following assembling method. That is, the array substrate and the counter substrate are caused to approach each other while at least one of the substrates is deflected. In this state, the positioning of the substrates is carried out by moving at least one of the substrates. Then, after positioning, the panel alignment of the array substrate and the counter substrate via the sealing material is carried out. Subsequently, the display regions of the array and counter substrates contact each other via the spacer by removing the deflection of the substrate.

With this construction, even if the positioning of the array substrate and the counter substrate is carried out while the substrates are in very close to each other, the display regions do not contact each other via the spacers, so that it is possible to prevent the display region from being damaged by the spacers. Therefore, it is possible to prevent bad alignment and bad image due to scars to provide a liquid crystal display having improved picture quality. Moreover, if the positioning of the array substrate and the counter substrate is carried out while the substrates are in very close to each other, it is possible to achieve accurate positioning, so that it is possible to more improve picture quality.

Moreover, while a liquid crystal display has been assembled using a glass substrate having a single effective region in the above described preferred embodiments, a plurality of liquid crystal displays may be simultaneously assembled using a glass substrate having a plurality of effective regions. In this case, a plurality of recessed portions corresponding to effective regions may be provided in at least one stage. Alternatively, a single recessed portion may be provided in at least one stage, and a plurality of projections may be provided in the recessed portion so that the height of the projections gradually increases as approaching the peripheral portion of the recessed portion from the central portion of the recessed portion, at which the height of the projection is lowest.

As described above, according to the present invention, it is possible to provide an assembling method and apparatus for assembling a pair of substrates without making scars thereon.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An apparatus for assembling a liquid crystal display by positioning first and second substrates, which has a sealing material surrounding a display region in which a plurality of spacers are provided, said apparatus comprising:
   an upper stage for holding said first substrate; and
   a lower stage for holding said second substrate,
   wherein at least one of said upper and lower stages has a mechanism for deflecting a display region of at least one of said first and second substrates so as to go away from a display region of the other substrate.

2. An apparatus for assembling a liquid crystal display by positioning first and second substrates, which has a sealing material surrounding a display region in which a plurality of spacers are provided, said apparatus comprising:
   an upper stage for holding said first substrate; and
   a lower stage, arranged below said upper stage, for holding said second substrate in a mounting state, said lower stage having a peripheral portion for mounting said second substrate thereon and an inside recessed portion surrounded by said peripheral portion, said recessed portion allowing said second substrate to be deflected downwards due to the weight of said second substrate itself in said mounting state of said second substrate.

3. An apparatus for assembling a liquid crystal display as set forth in claim 2, which further comprises a pushing-up stage, provided in said recessed portion of said lower stage, for supporting thereon a lower surface of said second substrate supported on said lower stage, to control the amount of downward deflection caused by the weight of said second substrate itself.

4. An apparatus for assembling a liquid crystal display as set forth in claim 2, wherein said upper stage is a flat stage for vacuum-holding said first substrate through a suction port which is opened from a lower surface to an inside of said upper stage, and said suction port is exhausted by exhaust means, which is connectable to the inside of said suction port, to vacuum hold said first substrate.

5. An apparatus for assembling a liquid crystal display as set forth in claim 2, wherein said recessed portion has means for evacuating said recessed portion.

6. An apparatus for assembling a liquid crystal display as set forth in claim 2, wherein said first and second substrates are assembled so as to be spaced from each other via said spacers, and said spacers are fixed to one of said first and second substrates.

7. An apparatus for assembling a liquid crystal display as set forth in claim 1, wherein an alignment layer is formed on a facing surface of each of said first and second sub-strates, said facing surface of one of said first and second substrates facing said facing surface of the other substrate.

8. An apparatus for assembling a liquid crystal display as set forth in claim 2, wherein an alignment layer is formed on a facing surface of each of said first and second subs-trates, said facing surface of one of said first and second substrates facing said facing surface of the other substrate.

9. A method for assembling a liquid crystal display, which comprises the steps of:
   arranging first and second substrates so as to face each other, a sealing material being provided with between said first and second substrates, which sealing material surrounds a display region in which a plurality of spacers are provided;
   aligning peripheral portions of said first and second substrates with each other via said sealing material; and
   positioning said first and second substrates by moving at least one of said first and second substrates which have been panel aligned with each other, while a display region of at least one of said first and second substrates is deflected so as to go away from a display region of the other substrate.

10. A method for assembling a liquid crystal display by positioning first and second substrates, which has a sealing material surrounding a display region in which a plurality of spacers are provided, said method comprising the steps of:
    holding said first substrate by means of an upper stage; and
    holding said second substrate in a mounting state by means of a lower stage arranged below said upper stage,
    said lower stage having a peripheral portion for mounting said second substrate thereon and an inside recessed portion surrounded by said peripheral portion, said recessed portion allowing said second substrate to be deflected downwards due to the weight of said second substrate itself in said mounting state of said second substrate.

11. A method for assembling a liquid crystal display as set forth in claim 9, wherein said upper stage is a flat stage for vacuum holding said first substrate by means of a suction port which is opened from a lower surface to an inside of said upper stage, and said suction port is exhausted by exhaust means which is connectable to the inside of said suction port to vacuum hold said first substrate.

12. A method for assembling a liquid crystal display as set forth in claim 9, wherein an alignment layer is formed on a facing surface of each of said first and second substrates, said facing surface of one of said first and second substrates facing said facing surface of the other substrate.

13. A method for assembling a liquid crystal display as set forth in claim 10, wherein an alignment layer is formed on a facing surface of each of said first and second substrates, said facing surface of one of said first and second substrates facing said facing surface of the other substrate.

14. A method for assembling a liquid crystal display, which comprises the steps of:

arranging an array substrate and a counter substrate so as to face each other, said array substrate having a sealing material which surrounds a display region in which a plurality of spacers are provided, and said array substrate having pixels and being substrate with electrodes;

aligning a peripheral portion of said array substrate with a peripheral portion of said counter substrate via said sealing material; and positioning said array substrate and said counter substrates by moving at least one of said array substrate and said counter substrates which have been panel aligned with each other, while a display region of at least one of said array substrate and said counter substrates is deflected so as to go away from a display region of the other substrate.

15. A method for assembling a liquid crystal display as set forth in claim 14, wherein said upper stage is a flat stage for vacuum-holding said counter substrate through a suction port which is opened from a lower surface to an inside of said upper stage facing said lower stage, and said suction port is exhausted by exhaust means, which is connectable to the inside of said suction port, to vacuum hold said counter substrate.

16. A method for assembling a liquid crystal display as set forth in claim 14, wherein said counter substrate and said array substrate are assembled so as to be spaced from each other via said spacers, and said spacers are fixed to one of said counter substrate and said array substrate.

17. A method for assembling a liquid crystal display, which comprises the steps of:

arranging first and second substrates so as to face each other, a sealing material being provided with between said first and second substrates, which sealing material surrounds a display region in which a plurality of spacers are provided;

aligning peripheral portions of said first and second substrates with each other via said sealing material;

positioning said first and second substrates by moving at least one of said first and second substrates which have been panel-aligned with each other, while a display region of at least one of said first and second substrates is deflected so as to go away from a display region of the other substrate; and removing the deflection of said at least one of said first and second substrates after said positioning is completed, to cause said display regions of said first and second substrate to contact each other via spacers.

* * * * *